(12) United States Patent
Francescon et al.

(10) Patent No.: US 8,135,977 B2
(45) Date of Patent: Mar. 13, 2012

(54) PROCESS FOR DIGITAL, BIDIRECTIONAL DATA TRANSMISSION

(75) Inventors: Massimo Francescon, Turin (IT); Ulrich Armbruster, Donaueschingen (DE); Simon Stein, Freiburg (DE)

(73) Assignee: Sick Stegmann GmbH, Donaueschingen (DE)

( * ) Notice: Subject to any disclaimer, the term of this patent is extended or adjusted under 35 U.S.C. 154(b) by 414 days.

(21) Appl. No.: 12/458,695

(22) Filed: Jul. 21, 2009

(65) Prior Publication Data

US 2010/0023791 A1    Jan. 28, 2010

(30) Foreign Application Priority Data

Jul. 23, 2008    (EP) .................................... 08013238

(51) Int. Cl.
*G06F 15/16*    (2006.01)
*G06F 1/12*    (2006.01)
(52) U.S. Cl. ........ 713/500; 713/375; 713/400; 370/229; 370/350
(58) Field of Classification Search .................. 713/375, 713/400, 500; 370/229, 350
See application file for complete search history.

(56) References Cited

U.S. PATENT DOCUMENTS

| | | | |
|---|---|---|---|
| 5,428,603 A | 6/1995 | Kivett | |
| 2003/0085742 A1* | 5/2003 | Jain | 327/156 |
| 2004/0267951 A1* | 12/2004 | Hattori | 709/231 |
| 2005/0232394 A1* | 10/2005 | Gray | 378/114 |
| 2007/0263589 A1* | 11/2007 | Francescon et al. | 370/350 |

FOREIGN PATENT DOCUMENTS

| | | |
|---|---|---|
| DE | 10 2004 025 388 B4 | 12/2005 |
| DE | 10 2006 022 284 A1 | 11/2007 |
| EP | 0 100 386 A1 | 2/1984 |
| EP | 1 434 382 B1 | 6/2004 |

* cited by examiner

*Primary Examiner* — Vincent Tran
(74) *Attorney, Agent, or Firm* — The Nath Law Group; Jerald L. Meyer; Stanley N. Protigal

(57) ABSTRACT

The invention relates to a process for digital, bidirectional data transmission between a processing unit and a position encoder, as based on the transmission of frames of a predetermined bit length, such that each frame is provided with at least an initial bit length for the transmission of data from the processing unit to the position encoder and at least a second bit length for the transmission of data from the position encoder to the processing unit; and such that the frame is provided with a time slot in which data is neither transmitted from the processing unit to the position encoder nor from the position encoder to the processing unit. In the time slot a triggering signal (external sync signal) is transmitted from the processing unit to the position encoder and this triggers the acquisition of position data. In the first bit length, a clock signal for synchronizing the processing unit and the position encoder is transmitted from the processing unit to the position encoder, and after the acquisition of position data triggered by the external sync signal, the acquired position data is transmitted from the position encoder to the processing unit. Between the transmission of two successive external sync signals at least one additional position-data request signal (internal sync signal) is transmitted from the processing unit to the position encoder, and this signal triggers another acquisition of position data, which is followed by the transmission of the acquired position data from the position encoder to the processing unit.

17 Claims, 7 Drawing Sheets

PROCESS FOR DIGITAL, BIDIRECTIONAL DATA TRANSMISSION

Figure 1:
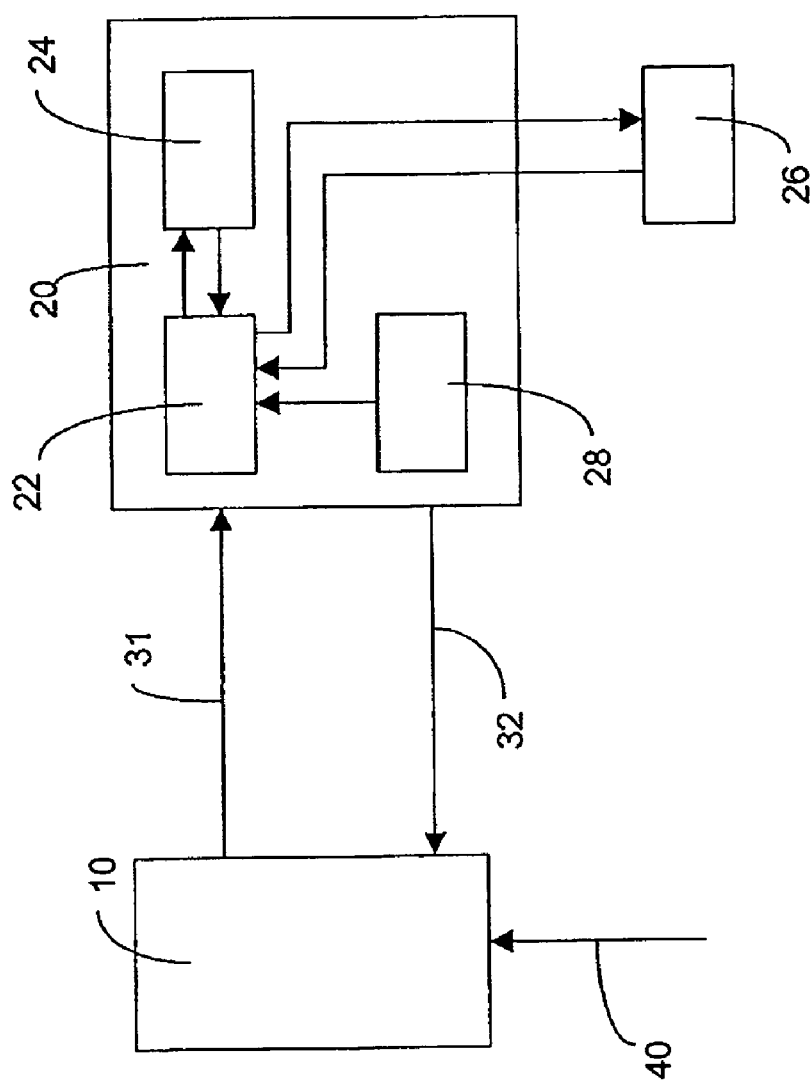

The invention relates to a process for digital, bidirectional data transmission in accordance with the preamble of patent claim 1. The invention relates, in particular, to a process for digital, bidirectional data transmission between a processing unit and a position-measuring system or position encoder.

EP 0 171 5079 A1 discloses a configuration for the serial transmission of the measured data from at least one transducer, in which the measured data, queued in parallel fashion, is stored in a parallel-series shift register and is transmitted serially in time with a sequence of clock signals, which are produced by the processing unit which receives the measured data. A disadvantage in this process is that the data is transmitted only from the measured data transducer to the processing unit.

DE 100 30 358 A1 discloses a process for serial data transmission between a position-measuring system, or position encoder, and a processing unit, such that position data and other data in digital form are transmitted from the position encoder to the processing unit. In response to a position request given by the processing unit, current position data are transmitted from the position encoder to the processing unit. Other data whose processing is not time-critical are continually added to the position data. In addition, a position request is transmitted to the position encoder to request position data, after which other data is continually transmitted whose processing is not time-critical. The data transmission from the processing unit to the position encoder takes place on a different data cable than data transmitted from the position encoder to the processing unit. Moreover, a concrete position request is necessary in order to transmit position data, as a result of which the interval of time between the transmission of two sets of position data can be a long one.

Since transmission of data on a long cable is susceptible to disturbance, it is also known to transmit data in differential fashion, and to this end, two cables that are twisted together can be used in order to transmit a signal with a reversed sign on both cables. For this kind of data transmission, U.S. Pat. No. 4,486,739 reveals an alternative that ensures direct current adjustment, known specifically as 8B/10B coding.

In order to synchronize the processing unit with the position encoder, it is known to transmit a clock signal over an additional data cable between the processing unit and the position encoder. However, it is also known to transmit the clock signal for synchronizing the processing unit and the position encoder over the data cable between the processing unit and the position encoder, in order to thereby reduce the number of data cables.

DE 10 2006 022 284 A1 discloses a process for digital, bidirectional data transmission between a processing unit and a position encoder, as based on the transmission of frame of a predetermined bit length. In each frame there is provided at least an initial bit length for the transmission of data from the processing unit to the position encoder and at least a second bit length for the transmission of data from the position encoder to the processing unit. In addition, the frame is provided with a time slot, in which data is neither transmitted from the processing unit to the position encoder nor from the position encoder to the processing unit and in which a triggering signal is transmitted from the processing unit to the position encoder. This signal triggers the acquisition of position data. The process makes possible a jitter-free transmission of the scanning time-point, so that no undesired time delay between the triggering signal and the acquisition of position data is present in the position encoder.

The goal of the invention is to more effectively design a process for the digital, bidirectional data transmission between a processing unit and a position encoder.

This goal is achieved by the invention in a process with the features of patent claim 1.

Advantageous embodiments and elaborations of the invention are indicated in the secondary claims.

The process according to the invention for the digital, bidirectional data transmission between a processing unit and a position encoder, as based on the transmission of frames of a predetermined bit length, such that each frame is provided with at least an initial bit length for the transmission of data from the processing unit to the position encoder and at least a second bit length for the transmission of data from the position encoder to the processing unit, and such that the frame is provided with a time slot in which data is neither transmitted from the processing unit to the position encoder nor from the position encoder to the processing unit and in which a triggering signal, or external sync signal, is transmitted from the processing unit to the position encoder, which signal triggers the acquisition of position data, is characterized by the fact that a clock signal for synchronizing the processing unit and the position encoder is transmitted in the first bit length from the position encoder, and after the position data acquisition triggered by the external sync signal, the acquired position data is transmitted from the position encoder to the processing unit, and between the transmission of two successive external sync signals at least one additional position-data request signal, or internal sync signal, is transmitted from the processing unit to the position encoder, and this signal triggers another acquisition of position data, which is followed by the transmission of the acquired position data from the position encoder to the processing unit.

The transmission of the clock signal for synchronizing the processing unit with the position encoder inside the first bit length from the processing unit to the position encoder is advantageous in that no additional data cable is required to transmit the clock signal. The number of data cables between the processing unit and the position encoder is thus reduced.

The transmission of at least one—and preferably more—internal sync signals (or position request signals) between two successive external sync signals, and the subsequent acquisition of further position data and the transmission of the acquired position data, is advantageous in that the internal sync signal can be much more frequently applied to the processing unit, and thus information on the position data from the position encoder is available at shorter intervals of time. An essential fact here is that the external sync signals are externally specified, while the additional data request signals are internally generated in the processing unit and are therefore independent of the external sync signal.

It is preferred that in the time interval between two external sync signals a plurality of internal sync signals is transmitted from the processing unit to the position encoder, and it is particularly preferred that the time between two external sync signals is a whole-number multiple of the time between two internal sync signal. This results in a cyclical transmission of position data with a markedly shorter time interval than the one resulting only from a request based on the transmission of external sync signals.

According to a preferred embodiment of the invention, data is transmitted over two cables, particularly over two supply cables or cables positioned between the processing unit and the position encoder. Data transmission over two cables has an advantage in that it is markedly less susceptible to disturbance than data transmission over only one cable and in that it permits data transmission in a differential manner, as specified in a preferred embodiment of the invention. Data transmission over two supply cables running between the processing unit and the position encoder—in particular, the power supply and voltage supply cables—makes it possible to reduce the total number of cables between the processing unit and the position encoder to two, and thus makes it possible to reduce the cost of the arrangement.

In order to further reduce susceptibility to disturbances during data transmission, the process is preferably designed so that direct current compensation or adjustment is guaranteed for the data transmission, and this is achieved in particular through use of an 8B/10B code. This kind of data transmission is also advantageous in that the number of bit alternations is sufficiently high and thus a reliable transmission is also guaranteed for the clock signal used to synchronize the processing unit and the position encoder, over the same cables that are employed for data transmission.

In order to reduce the band width, the position data—as well as other data—are transmitted as differential data of the first or second order. Differential data are understood as the absolute value's change or difference from the last absolute value. Differential data of the second order are consequently understood as the change or difference from the last differential value, i.e., from the last change in value. If 40 bits are required for the transmission of the absolute position value, the number of bits can be reduced to 24 for the transmission of position data as differential data of the first order, and the number of bits can be reduced to only 11 for the transmission of position data as differential data of the second order, when customary value-range restrictions are assumed for the differential values of the first or second orders in the position encoders.

In order to minimize error rates for the transmission of differential data, the process specifies that after a predetermined number of differential data—e.g., after 2, 4, or 8—the data being transmitted are additionally transmitted as absolute values. The absolute data reconstructed from the differential data are compared to the exact absolute data and are rejected when there is a discrepancy; the exact absolute value is then used as a basis for the further calculations.

In the process according to the invention the data transmission is advantageously examined for errors, specifically by means of a CRC process (cyclic redundancy check).

According to a particularly preferred embodiment of the invention, the data transmission is performed redundantly, in order to provide a secure process for data transmission between the processing unit and the position encoder—and thus to provide a sensor that is secure in terms of machine safety. This means that the sensor must satisfy the pertinent EN 954 or EN 61508 standards, which deal with machine safety. Redundant data transmission can be guaranteed, e.g., by a two-channel design for mutually independent position-data transmissions, by test structures, or by self-examining structures. Or some other means must be provided for ensuring reliable functioning despite the presence of errors, as must the capability for identifying errors independently.

An advantageous feature specifies that not only position data, but other data—specifically, measured data from other measuring systems, whose acquisition is also triggered by an external sync signal—is transmitted, to thereby avoid the use of additional data cables, particularly for other external sensors. The other measuring systems can take the form of, e.g., acceleration sensors, vibration sensors, torque sensors, or temperature sensors.

If the time between the individual internal sync signals is too short to permit the transmission of all desired or ready data, a preferred embodiment of the invention provides that the individual data to be transmitted are divided into data segments, which can be transmitted in segments in response to the individual internal sync signals.

The system according to the invention has a processing unit and a position measuring system (position encoder), between which bidirectional data are transmitted. Here the transmission of data unfolds in a process according to one of the preceding claims [sic]. The position-measuring components are preferably designed as rotary encoders. Two supply cables or cables are advantageously positioned between the processing unit and the position encoder and these cables are simultaneously used for data transmission in order to reduce the number of data cables between the processing unit and the position encoder, and specifically to limit the number to two such cables. According to a particularly preferred embodiment, the data cables, which simultaneously represent the supply cables, are integrated into a motor cable.

The invention is next described in detail on the basis of the figures. Shown are:

FIG. 1 a schematic depiction of the system according to the invention

Figure 2:
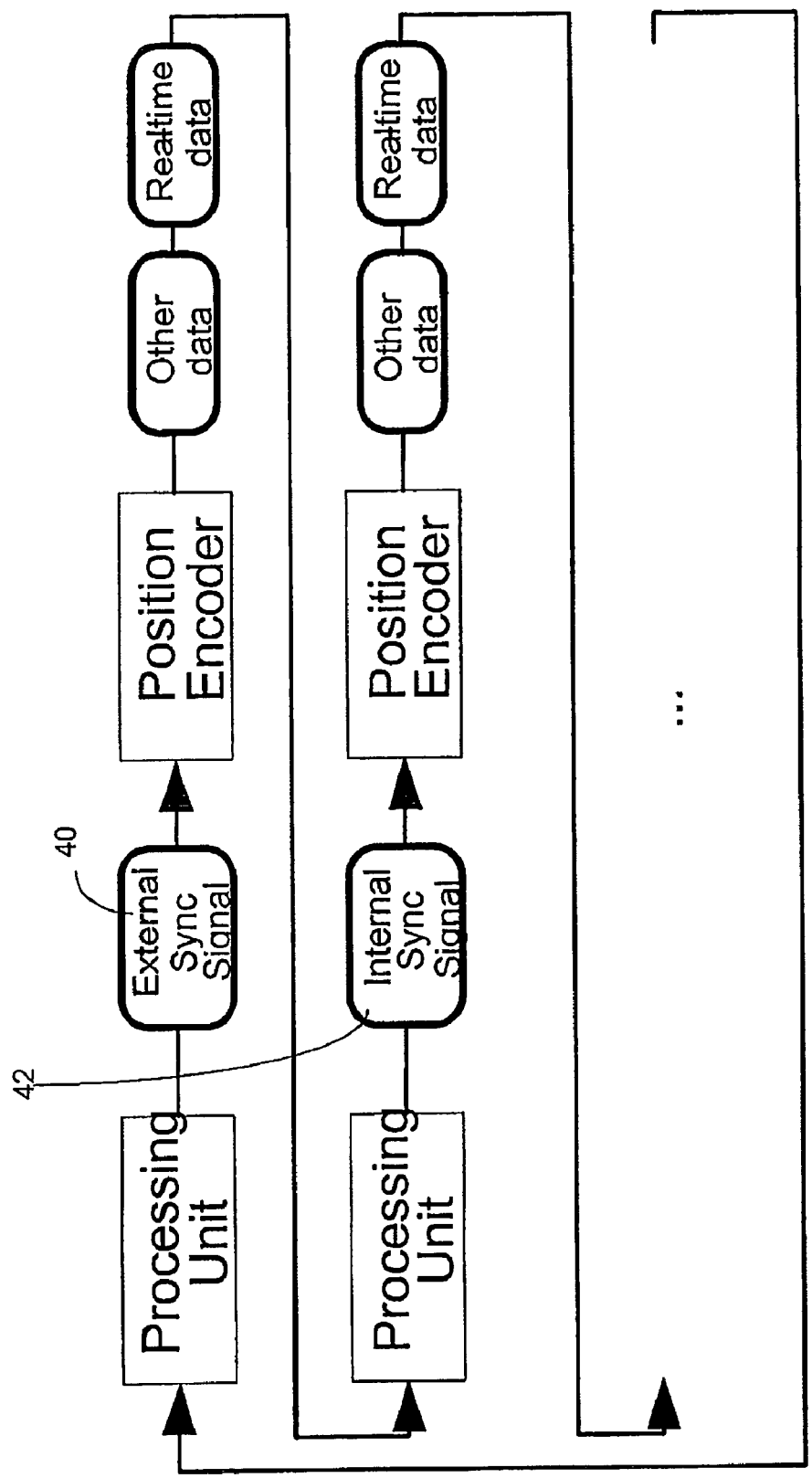
Figure 3:
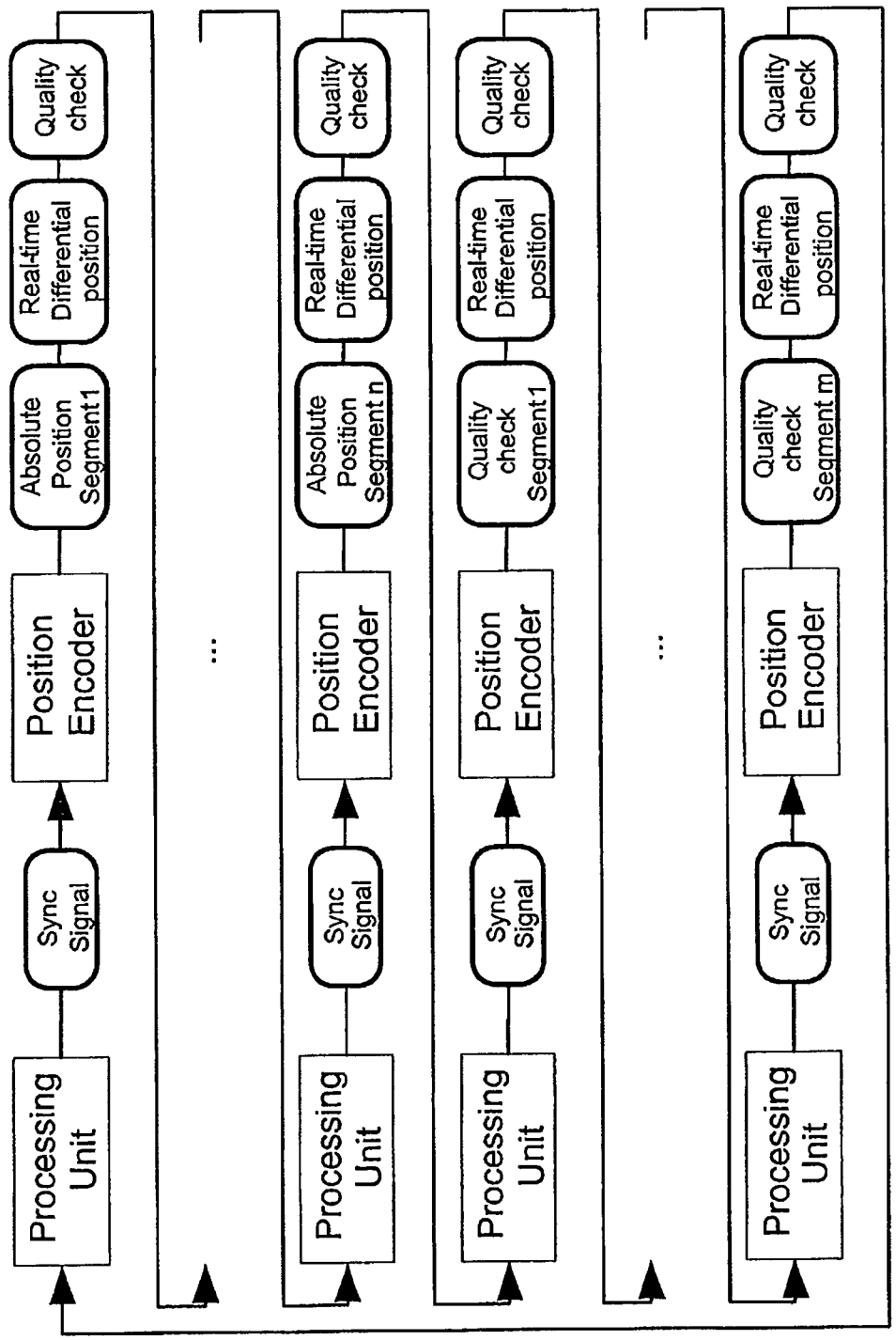
Figure 4:
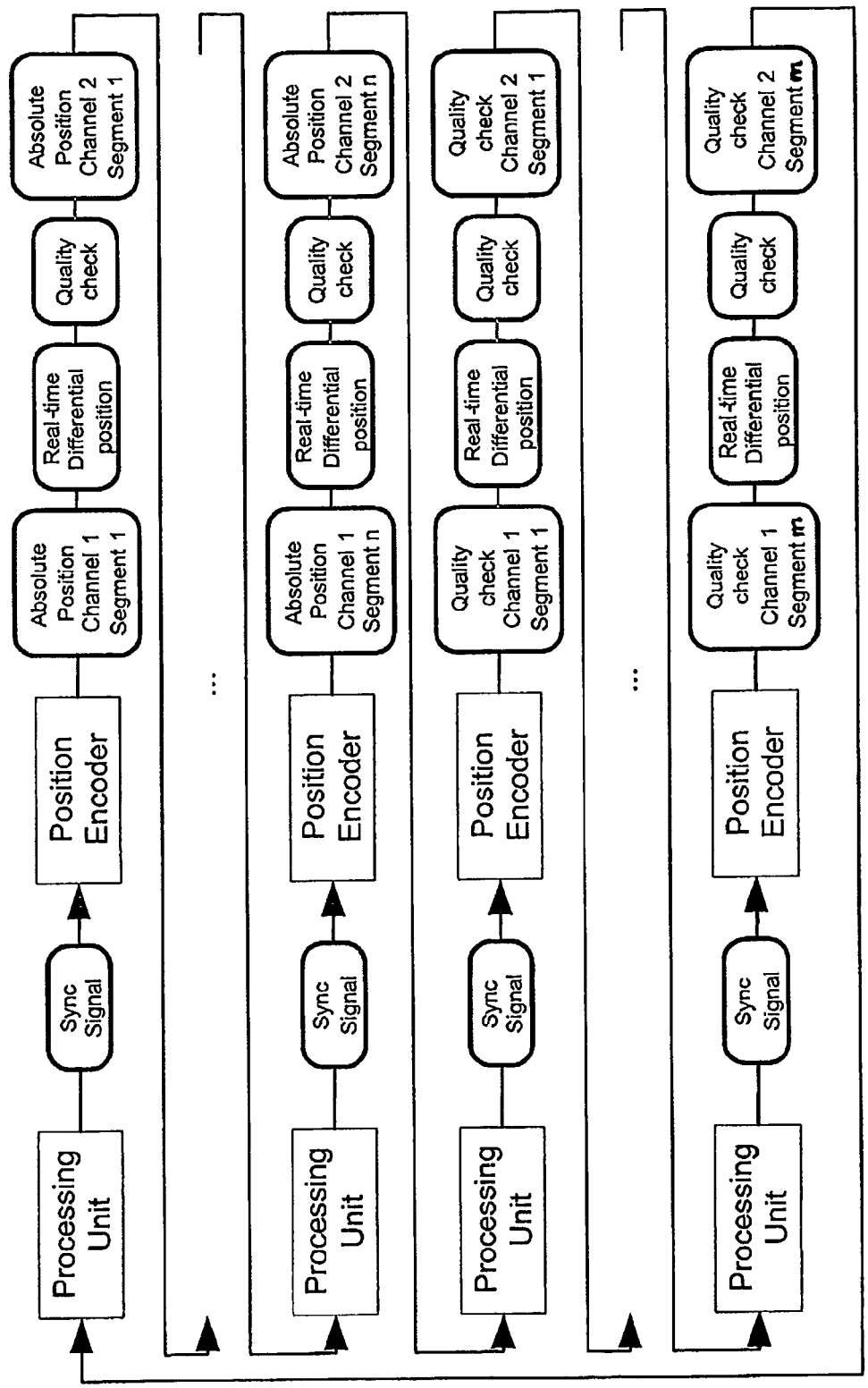
Figure 5:
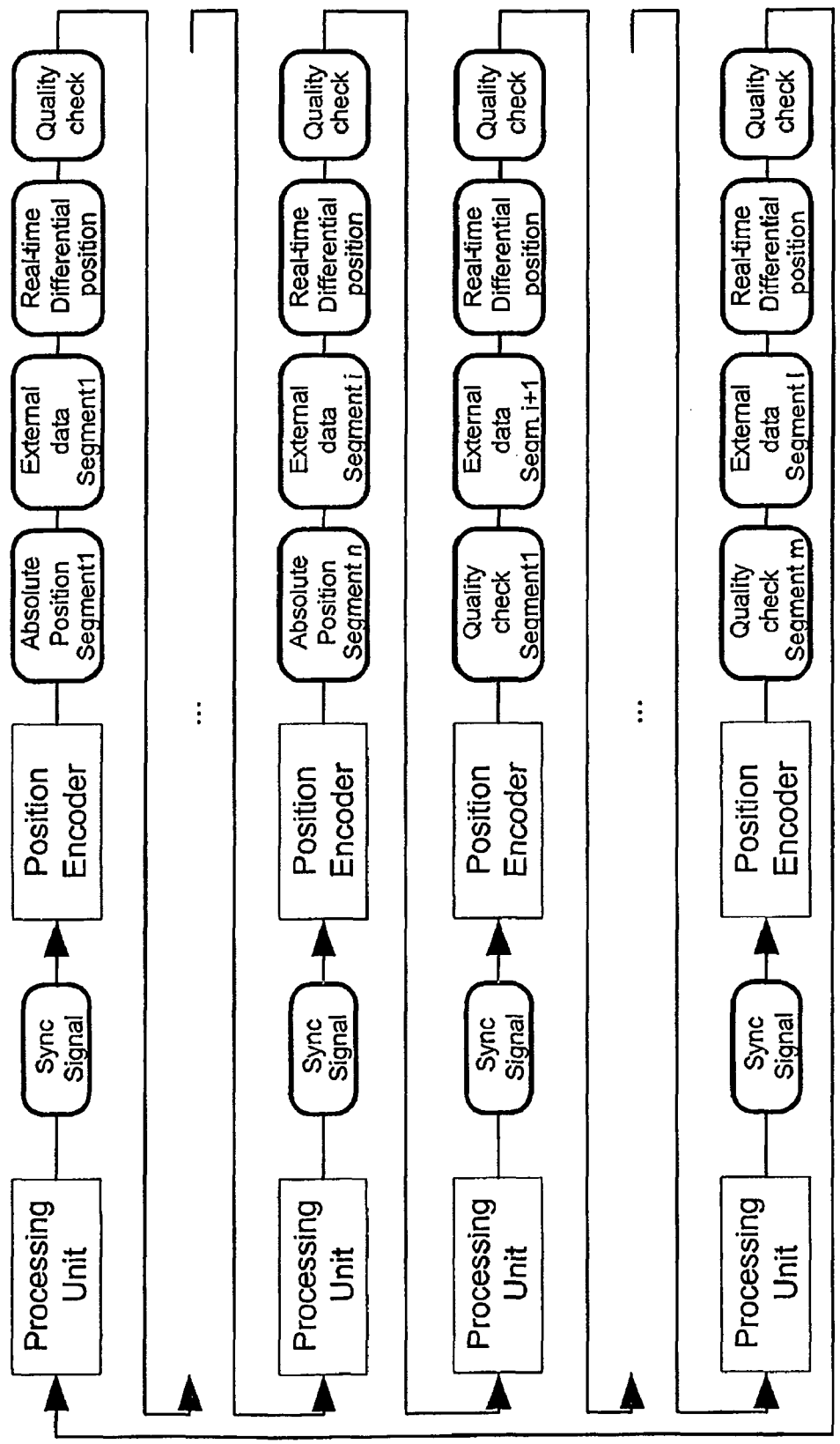
Figure 6:
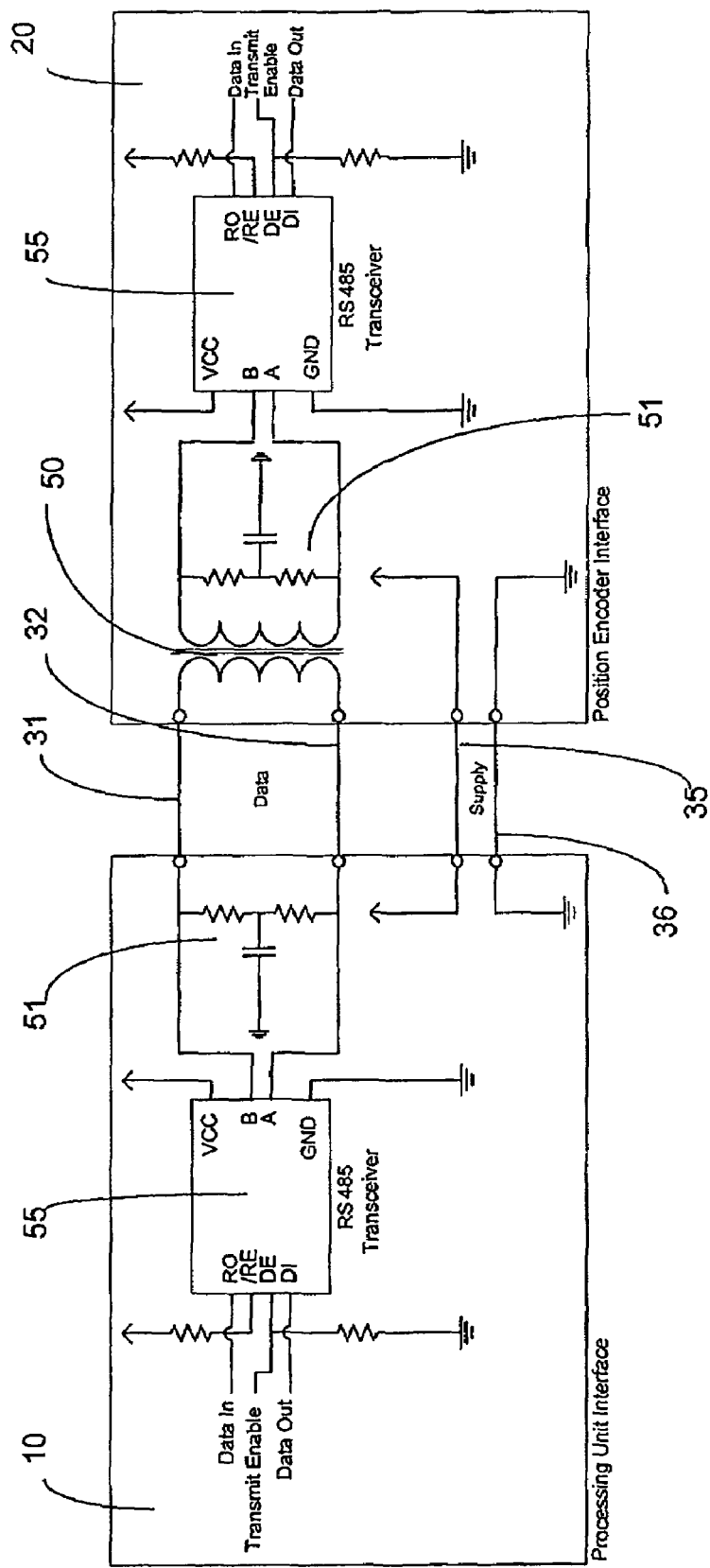
Figure 7:
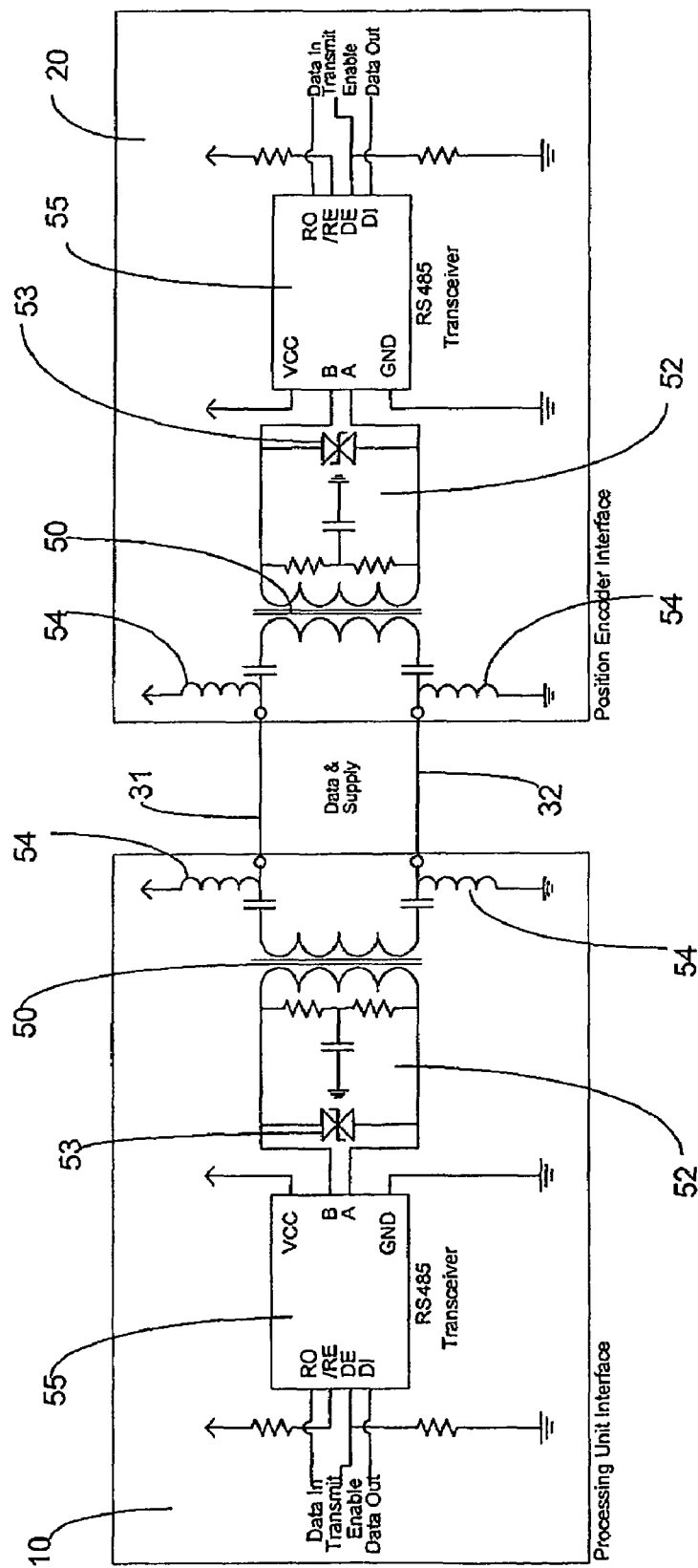

FIG. 2 a data transmission protocol according to an initial embodiment of the invention FIG. 3 a data transmission protocol according to a second embodiment of the invention FIG. 4 a data transmission protocol according to a third embodiment of the invention FIG. 5 a data transmission protocol according to a fourth embodiment of the invention FIG. 6 a circuit arrangement for data transmission, with four cables FIG. 7 a circuit arrangement for data transmission, with two cables.

FIG. 1 gives a schematic depiction of a system with a processing unit 10 and a position encoder 20, between which data can be transmitted in both directions over two data cables 31, 32, as based on the transmission of frames with a predetermined bit length. In each frame there is provided at least an initial bit length for the transmission of data from the processing unit 10 to the position encoder 20 and at least a second bit length for the transmission of data from the position encoder 20 to the processing unit.

The two data cables 31, 32 can simultaneously represent the supply cable from the processing unit 10 to the position encoder 20, so that only two data cables must be provided between the processing unit 10 and the position encoder 20 (cf. FIG. 7).

The data cables 31, 32 are advantageously wound together in order to reduce disruptive influences. To further reduce the susceptibility of the data cables 31, 32 to outer influence and disturbance, the data is also transmitted in such a way that direct current adjustment is guaranteed. This is achieved specifically through the use of an 8B/10B code.

The position encoder 20 has a communications unit 22 for communicating with the processing unit 10. It also has a data acquisition unit 24 for recording the position data, e.g., a rotary encoder, and a storage unit 26, whose contents might include, e.g., internal data from the position encoder and/or the rotary encoder. The position encoder can be connected to other measuring systems 28, which might take the form, e.g., of acceleration sensors, vibration sensors, torque sensors, or temperature sensors and which provide additional data and information on the status of the position encoder 20, particularly the rotary encoder. This data can be transmitted over the data cables 31, 32 to the processing unit, in addition to the position data. The acceleration sensor or vibration sensor makes it is possible to determine, e.g., the acceleration or vibration of the rotary encoder, or the motor system to which the rotary encoder is connected. With the torque sensor, the torque of the shaft of the rotary encoder or motor can be determined. The temperature sensor monitors the temperature of the rotary encoder. All sensors can advantageously identify deviations from the pre-established reference values, in order to monitor the system for any errors that might arise.

Conducted to the processing unit 10 is an external sync signal 40, which triggers position-data acquisition in the position encoder 20. For this to happen, the external sync signal 40 must be transmitted from the processing unit 10 to the position encoder 20 in as jitter-free a manner as possible. This is advantageously achieved through the provision in the frame of a time slot in which data is neither transmitted from the processing unit 10 to the position encoder 20, nor from the position encoder 20 to the processing unit 10, and in which the external sync signal 40 is transmitted directly from the processing unit 10 to the position encoder 20. In this way it is possible to avoid time delays which might arise as a result of the transmission of the external sync signal in the predetermined cycle of the processing unit 10.

The processing unit 10 is synchronized with the position encoder 20 by means of a clock signal, which is also transmitted over the data cables 31, 32, with the result that a separate data cable is unnecessary for transmitting this clock signal. A specific bit length is also provided in the frame for this purpose. The use of an 8B/10B coding specifically ensures that the high rate of bit exchange necessary for reliable transmission of the clock signal is provided.

FIG. 2 shows a data transmission protocol, which represents a frame length. The external sync signal 40 is transmitted from the processing unit 10 to the position encoder 20 inside a time slot in the frame, as previously described. This external sync signal 40 triggers the acquisition of position-data in the position encoder 20. During this process of position-data acquisition, data that is not critical with respect to time ("other data") can be transmitted to the processing unit 10. This other data may be, e.g., measured data from one portion of the other measuring systems 28 already described, for example, temperature data. Or the other data may be system information on the position encoder 20. As soon as the position-data acquisition has occurred in the position encoder 20, the position data are transmitted from the position encoder 20 to the processing unit 10. The position data are data that are critical with respect to time (real-time data), which must be transmitted in the cycle of the processing unit 10 and position encoder 20. Other real-time data may be from a portion of the other measuring systems 28 already described, for example, data from an acceleration sensor, a vibration sensor, or a torque sensor.

As can be seen from FIG. 2, only one external sync signal 40 is transmitted per frame. However, since the time interval between two external sync signals 40 can be comparatively large, the position data for some application purposes are left pending. For this reason, the time interval between two external sync signals 40 is determined in the processing unit 10 at the beginning of data transmission. The processing unit 10 then generates internal position-request signals 42 (internal sync signals), which are periodically transmitted from the processing unit 10 to the position encoder 20 between two successive external sync signals. After each internal sync signal 42 there is another acquisition of position data, with a transmission of position data from the position encoder 20 to the processing unit 10. Thus the position data are much more frequently provided to the processing unit 10, with the result that it is possible to more precisely record the position data.

During the position-data acquisition other data that is uncritical with respect to time can again be transmitted. Depending on the interval between external sync signals 40 and on the desired frequency of the request for position data, only one or—alternatively—a plurality of additional internal sync signals 42 can be transmitted.

FIG. 3 shows another data transmission protocol with a plurality of frames, where each line in the schematic data transmission protocol represents a frame. The additional internal sync signals according to FIG. 2, with the subsequently transmitted data, have been omitted for the sake of clarity.

To increase the band width, the position data and (as the case may be) the other real-time data and data that are not critical with respect to time are transmitted as differential data (real-time differential position). After the given transmission of the absolute position data, in the transmission of the next position-data value, only the change from the preceding value, i.e., the difference in value, is transmitted, and not the absolute value. When differential data of the first order are transmitted, the number of needed bits can be reduced from 40 to 24 bits. For transmission of differential data of the second order, the number of required bits can even be reduced to 11. However, to check the transmission quality, at certain intervals—for example, after two, four, or eight transmitted differential data—the position data are again transmitted as absolute data (absolute position), in addition to the differential data. This makes it possible to compare the absolute position data, reconstructed from the differential data, with the actually present absolute position data, and, when there is a discrepancy, to revert to the correct absolute position data that is actual present.

Depending on its length, the interval between the external sync signals 40 or, as the case may be, the internal sync signals 42 may be too short to permit, e.g., the complete transmission of the absolute position data, or of other data, in addition to the differential data. As shown in FIG. 3, it is then possible to advantageously divide the data being transmitted into a certain number (n) of data segments and to transmit only one data segment between the external sync signals 40 or (as the case may be) the internal sync signals 42. After transmission of the n data segments constituting the absolute position data (absolute position segment 1 to n) the complete data can be reconstructed.

Alternatively, or in addition to the transmission of the absolute position data, it is possible to perform an error check in each frame, e.g., with a CRC process (cyclic redundancy check). The data to be transmitted within the frame (quality check) can also be transmitted as absolute data, differential data, or as data segments (quality check segment 1 to m). As shown in FIG. 3, it is possible in principle to transmit a data segment either from the absolute position data or from the absolute data of the error check, in advance of any position data transmitted as differential data. As an alternative, a data segment can be transmitted from the absolute position data and from the absolute data of the error check, in advance of any position data transmitted as differential data.

The data and data segments to be transmitted can be transmitted both following the external sync signal and following the additional internal sync signals, depending on the manner in which the position data acquisition was triggered.

To securely design the system, the data transmission protocol must satisfy certain requirements; in particular, must meet the pertinent security standards. To this end, data transmission may occur redundantly, as described on the basis of FIG. 4. The additional internal sync signals of FIG. 2, and the data transmitted in response, have again been omitted for the sake of clarity. Each line again represents a frame. The position encoder 20 has a second channel for independent data acquisition of secondary position data (absolute position channel 2), and here the position data of the second channel are transmitted either as absolute position data only, specifically in data segments (absolute position channel 2 segments 1 to 2), as shown in FIG. 4; or they are transmitted as differential data, with supplementary transmission of the absolute position data after the transmission of several differential data. As an alternative, or in addition (as shown in FIG. 4), the data transmission is checked for errors in the second channel (quality check channel 2), specifically with the CRC process, and here again the data can be transmitted as a whole or in data segments (quality check channel 2 segment 1 to m), depending on the time interval between the external sync signals or, as the case may be, the internal sync signals.

FIG. 5 shows another data transmission protocol with a plurality of frames, where each line of the schematic depiction represents a frame and the additional internal sync signals of FIG. 2, with the subsequently transmitted data, have been omitted for the sake of clarity. In this data transmission protocol, other data (external data)—in addition to the position data transmitted as differential data, the absolute position data additionally transmitted in data segments, and the data of the CRC process—are transmitted in the form of data segments (external data segment 1 to l), for example, from the other measuring systems previously described.

A common feature of all the described data transmission protocols rests in the fact that an external sync signal and at least one internal sync signal is transmitted in each frame, and here the acquired position data are transmitted either as absolute position data or as differential data in response to both the external sync signal and the internal sync signal. The other transmissions described on the basis of FIGS. 3 to 5 can be additionally transmitted either individually or in a desired combination.

FIG. 6 shows a circuit arrangement for the transmission of data between the processing unit 10 and the position encoder 20. The circuit arrangement has four cables, two of which constitute the data cables 31, 32. The other two cables 35, 36 provide the power and voltage supply for the position encoder 20. Data cables 31, 32 are twisted, and the data transmitted on these data cables 31, 32 is transmitted differentially. A transmitting and receiving circuit 55 is positioned on both the side occupied by the position encoder 20 and the side occupied by the processing unit 10, and this circuit 55 is connected to a bus termination 51 for filtering common-mode interference. This results in a very robust circuit which, in particular, can be positioned in the direct vicinity of the motor of the position encoder without appreciable interference arising. Positioned between the data cables 31, 32 and the bus termination 51, on the side occupied by the position encoder 20, is a transformer 50 for galvanic separation and for input and output coupling of the data to the data cables 31, 32.

FIG. 7 shows a circuit arrangement for data transmission between the processing unit 10 and the position encoder 20, with only two cables. These cables constitute the data cables 31, 32 and, at the same time, serve as supply cables for the position encoder 20. The data to be transmitted are coupled in by the transformer 50, on both the side occupied by the processing unit 10 and that occupied by the transformer 50. A bus termination 52 is positioned between the transmitting and receiving circuit 55 of the processing unit 10 and the associated transformer 50, as well as between the transmitting and receiving circuit 55 of the position encoder 20 and the associated transformer 50. To protect the transmitting and receiving circuit 55, a protective circuit 53 is added, in particular a suppressor diode. This makes it possible to also integrate both data cables 31, 32 directly into the cable leading to the motor of the position encoder, without fear of interference. The supply voltage for the position encoder 20 is applied to and removed from the data cables 31, 32 by the input or output coupling circuit 54.

LIST OF REFERENCE NUMERALS

10 processing unit
20 position encoder (position-measuring system)
22 communications unit
24 data acquisition unit
26 storage unit
28 measuring system
31 data cable
32 data cable
35 supply cable
36 supply cable
40 external sync signal (triggering signal)
42 internal sync signal (position-request signal)
50 transformer
51 bus termination
52 bus termination
53 protective circuit
54 input and output coupling circuit
55 transmitting and receiving circuit

The invention claimed is:

1. Process for digital, bidirectional data transmission between a processing unit and a position encoder, as based on the transmission of frames of a predetermined bit length, such that each frame is provided with at least a first bit length for the transmission of data from the processing unit to the position encoder and at least a second bit length for the transmission of data from the position encoder to the processing unit, and such that the frame is provided with a time slot in which data is transmitted neither from the processing unit to the position encoder nor from the position encoder to the processing unit and in which a triggering signal (external sync signal) is transmitted from the processing unit to the position encoder and this signal triggers the acquisition of position data, wherein a clock signal for synchronizing the processing unit and the position encoder is transmitted within the first bit length from the processing unit to the position encoder, and following the acquisition of position data triggered by the external sync signal, the acquired position data is transmitted from the position encoder to the processing unit, and between the transmission of two successive external sync signals at least one additional position-request signal (internal sync signal) is transmitted from the processing unit to the position encoder, and this signal triggers another acquisition of position data, which is followed by the transmission of the acquired position data from the position encoder to the processing unit.

2. Process according to claim 1, wherein a plurality of internal sync signals are periodically transmitted from the processing unit to the position encoder during the time interval between two external sync signals.

3. Process according to claim 1, wherein the time between two external sync signal is a multiple of the time between two internal sync signals.

4. Process according to claim 1, wherein
the data is transmitted over two cables, particularly over two supply cables positioned between the processing unit and the position encoder.

5. Process according to claim 4, wherein
the data transmission on the two cables occurs differentially.

6. Process according to claim 1, wherein
direct current adjustment is ensured for the data transmission, particularly through the use of an 8B/10B code.

7. Process according to claim 1, wherein
the position data are transmitted as differential data of the first or second order.

8. Process according to claim 7, wherein
the position data are transmitted as absolute data after a predetermined number of differential data, particularly after two, four, or eight differential data, have been transmitted.

9. Process according to claim 1, wherein
the data transmission is checked for errors, particularly with a CRC process (cyclic redundancy check).

10. Process according to claim 1, wherein
the data transmission occurs redundantly.

11. Process according to claim 1, wherein
other data, particularly measured data from other measuring systems, whose acquisition is specifically triggered by the external sync signal, are transmitted in addition to the position data.

12. Process according to claim 11, wherein
the other measuring systems take the form of acceleration sensors, vibration sensors, torque sensors, or temperature sensors.

13. Process according to claim 1, wherein
the individual data being transmitted are divided into data segments.

14. System with a processing unit and a position encoder, between which data are bi-directionally transmitted, where the data is transmitted in a process according to claim 1.

15. System according to claim 14, wherein
the position encoder takes the form of a rotary encoder.

16. System according to claim 14, wherein
two supply cables are positioned between the processing unit and the position encoder and said supply cables are used simultaneously for the transmission of data.

17. System according to claim 14, wherein
the data are transmitted over data cables which are integrated into a motor cable.

* * * * *